United States Patent
Wagner

(10) Patent No.: US 6,445,282 B1
(45) Date of Patent: Sep. 3, 2002

(54) THEFT PREVENTION SYSTEM FOR MOTOR VEHICLES

(75) Inventor: Armin Wagner, Maisach (DE)

(73) Assignee: Bayerische Motoren Werke AG, Munich (DE)

( * ) Notice: Subject to any disclaimer, the term of this patent is extended or adjusted under 35 U.S.C. 154(b) by 0 days.

(21) Appl. No.: 09/507,950

(22) Filed: Feb. 20, 2000

Related U.S. Application Data

(63) Continuation of application No. 08/168,245, filed on Dec. 3, 1993, now abandoned.

(30) Foreign Application Priority Data

Dec. 3, 1992 (DE) .......................................... 42 40 596

(51) Int. Cl.$^7$ ................................................. G06F 7/04
(52) U.S. Cl. ..................................... 340/5.3; 340/825.72
(58) Field of Search ............................... 340/5.3, 5.26, 340/5.21, 5.64, 26, 5.6, 64, 826.69, 825.72

(56) References Cited

U.S. PATENT DOCUMENTS

| 4,209,782 A | 6/1980 | Donath et al. ......... 340/825.56 |
| 4,413,261 A | 11/1983 | Greenberg ............. 340/825.72 |
| 4,596,985 A | 6/1986 | Bongard et al. ........ 340/825.69 |
| 4,738,334 A | 4/1988 | Weishaupt .................. 180/287 |
| 5,019,812 A | 5/1991 | Goestahagberg et al. |
| 6,191,703 B1 * | 2/2001 | Wallace ................. 340/825.69 |

FOREIGN PATENT DOCUMENTS

| DE | 3045345 | 7/1982 |
| DE | 3716811 | 12/1988 |
| DE | 3740638 | 12/1988 |
| EP | 0354102 | 2/1990 |
| FR | 2545632 | 11/1984 |
| FR | 2613993 | 10/1988 |

* cited by examiner

Primary Examiner—Michael Horabik
Assistant Examiner—William Bangachon
(74) Attorney, Agent, or Firm—Crowell & Moring LLP

(57) ABSTRACT

A process for preventing motor vehicle theft in which, while the anti-theft device is activated, a drive control device is switched off, the anti-theft device automatically transmits during each deactivating operation a transmittal code to the drive control device and the drive control device will be switched back on only when the transmitted transmittal code corresponds to a comparison code made available in the drive control device.

21 Claims, 1 Drawing Sheet

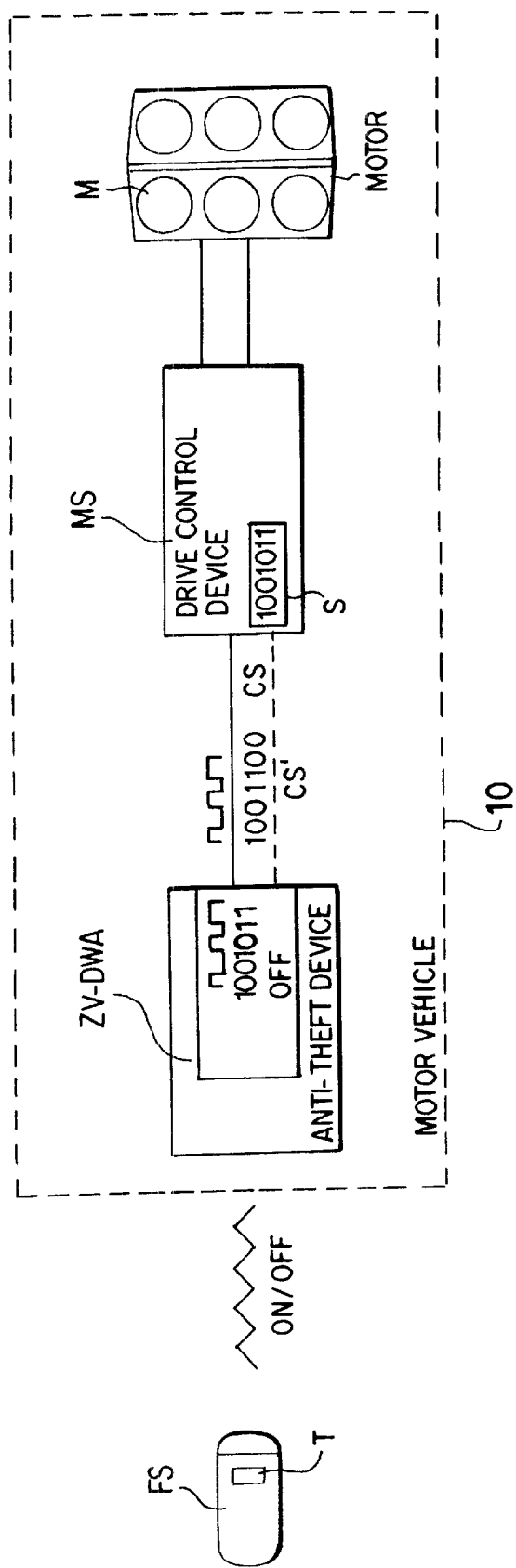

THEFT PREVENTION SYSTEM FOR MOTOR VEHICLES

This is a continuation of Ser. No. 08/168,245 filed Dec. 3, 1993, now abandoned.

BACKGROUND AND SUMMARY OF THE INVENTION

The present invention relates to a process for preventing motor vehicle theft, a drive control device being switched off when the anti-theft device is activated.

German Patent Documents DE 30 45 345 A1 and DE 37 16 811 A1, describe an anti-theft device for motor vehicles in which an essential function of the engine, such as the engine ignition, is blocked in order to prevent an unauthorized start of the operation of the motor vehicle. In German Patent Document DE 37 16 811 A1 as well as in German Patent Document DE 30 45 345 A1, it is provided that the anti-theft device can be deactivated only by the input of a safety code. However, the object of both documents indicates that the input of a safety code only closes switches for the release of the functions which are blocked when the anti-theft device is activated. Therefore, if the position is known of the switches assigned to the functions to be blocked, a closed condition of these switches can be simulated in a simple manner by a short circuit or by the feeding of a voltage.

Furthermore, anti-theft devices are known in the form of combined central locking and anti-theft warning devices. Such anti-theft devices in motor vehicles are usually connected via an information line with a drive control device, such as an engine control device, which controls all functions of an internal-combustion engine. When the anti-theft device is activated, a defined voltage level is fed to the information line, whereupon the engine control device prevents the start of the operation of the engine. If, as a result of a break-in, the effect of the anti-theft device is violently circumvented, in that, for example, the control device is unplugged, and/or a defined voltage level which corresponds to the deactivated anti-theft device is fed on the information line to the engine control device, the prevention of the start of the operation of the engine is eliminated.

An object of the invention to provide a process in which a drive control device in motor vehicles which is switched off when the anti-theft device is activated, remains switched off in a deactivating operation of the anti-theft device that differs from the proper one, particularly when the anti-theft device is circumvented, for example, by an unplugging or by destruction.

A proper deactivating operation of the anti-theft device may, for example, be the input of a safety code way of a keyboard, such as is provided in the two German Patent Documents DE 30 45 345 A1 and DE 37 16 811 A1. However, a further deactivating operation may also be the closing of a switch by a door lock or the wireless emission of a code signal by a portable transponder, in which case the anti-theft device represents the receiving device of this code signal.

The above described objects are achieved by the present invention which provides a process for preventing motor vehicle theft, comprising switching off a drive control device when an anti-theft device is activated in a deactivating operation, automatically transmitting via the anti-theft device during each deactivating operation a transmittal code to the drive control device, and switching the drive control device back on again only when the transmitted transmittal code corresponds to a comparison code in the drive control device.

According to the invention, a drive control device is switched off when the anti-theft device is activated. The drive control device will be switched back on only when the anti-theft device, particularly as a reaction to a proper deactivating operation, transmits a specific transmittal code to the drive control device of the motor vehicle. The drive control device compares the transmitted transmittal code with an available comparison code and permits the start of the operation of the engine or of the motor vehicle only when the transmittal code transmitted by the anti-theft device corresponds to the available comparison code.

The transmittal code transmitted by the anti-theft device and the comparison code made available by the drive control device may be formed so that they correspond to each other in different manners. For example, the transmittal code and the comparison code may be preprogrammed in the anti-theft device and in the drive control device, for example, during the vehicle assembly, to be permanently identical and fixedly assigned to each vehicle. However, they may also, for example, during each activating and deactivating operation of the anti-theft device, be changed in the same manner corresponding to an algorithm which is preprogrammed in both devices and is fixedly assigned to each vehicle.

The anti-theft device may, for example, be a conventional combined central locking/anti-theft warning system which is connected with an engine control device as the drive control device of the motor vehicle, for example, by way of a serial data line as the information line for the transmission of the transmittal code. The transmittal code may also be transmitted in a wireless manner, by a fiber-optic waveguide or by way of a database which already exists and which communicates between the control devices (for example, the central locking/anti-theft warning system and the engine control device).

An advantage of the present invention is that, when the anti-theft device is circumvented, the drive control device remains switched off if the anti-theft device was activated before, because the transmittal code is not transmitted or the transmittal code does not correspond to the comparison code. The simulation of a transmittal code in general and of a constantly changing transmittal code in particular is almost impossible with respect to the simulation of a constant level on the information line. This type of a prevention of the start of the operation of the motor vehicle is a reliable measure against motor vehicle theft.

According to certain embodiments of the invention, the anti-theft device transmits, at least once before a first deactivating operation, that is, during an initialization routine, a preprogrammed transmittal code to the drive control device. The drive control device stores this transmittal code as a comparison code. If the drive control device is switched off by an activating operation of the anti-theft device, it will now be switched on again when the transmittal code which previously had been transmitted for the first time, is transmitted again.

With these embodiments, the preprogramming of the anti-theft device only by means of a transmittal code to be transmitted will be sufficient. An exchange of defective control devices in the repair shop will be possible without any problem because the comparison code of the drive control device and the transmittal code automatically adapt to one another.

In certain embodiments of the invention, during each activating operation and during each deactivating operation, the transmittal code is transmitted from the anti-theft device to the drive control device. The transmittal code transmitted during an activating operation is in each case stored as a comparison code by the drive control device. The drive control device awaits this comparison code as a restart command in the case of a deactivation operation which follows.

Thus, during an activating operation, the transmission of the transmittal code may, at the same time, be used as a switch-off command, and the transmission of the transmittal code during a deactivating operation may at the same time be used as a switch-on command of the drive control device.

In certain embodiments of the invention, the transmittal code, which is transmitted during each activating operation, is changed, for example, by a random generator or by a coding operation in a specified manner. In this case, the transmittal code transmitted during an activating operation and the transmittal code transmitted during the immediately following deactivating operation will be the same. When the anti-theft device is activated again, the transmittal code is changed.

Because of the change of the transmittal code, these embodiments of the invention provide an effective protection against listening in and also makes a simulation of the transmittal code difficult because there is no predictability. Furthermore, an algorithm for changing the transmittal code must be preprogrammed only in the anti-theft device.

Other objects, advantages and novel features of the present invention will become apparent from the following detailed description of the invention when considered in conjunction with the accompanying drawings.

BRIEF DESCRIPTION OF THE DRAWINGS

The single drawing schematically illustrates an embodiment of the present invention for carrying out the process according to the invention.

DETAILED DESCRIPTION OF THE DRAWINGS

A combined central locking and anti-theft warning system ZV-DWA is connected by a code signal line CS with the engine control device MS of a motor vehicle 10. The engine control device MS comprises a memory S which is provided for the storing of a transmittal code transmitted at least for the first time by the central locking and anti-theft system ZV-DWA. Several control output lines lead from the engine control device MS to the internal-combustion engine M. For the switching-on and switching-off of the central locking and anti-theft system ZV-DWA, a remote-control key FS is provided which has a key button T as the actuating element.

If the motor vehicle is parked while the central locking and anti-theft warning system ZV-DWA is deactivated, and the key button T of the remote control key FS is actuated after the vehicle was exited, the central locking and anti-theft warning system ZV-DWA is switched on and activated (on). By means of this switch-on operation, a transmittal code (such as 1001011 is generated on the information line CS which is filed in the memory S of the engine control device MS as a comparison code (1001011) and whereby the engine control device MS by way of the control output lines prevents all functions for the start of the operation of the internal-combustion engine M. Upon another actuating of the key button T, the central locking and anti-theft warning system ZV-DWA is switched off or deactivated (off), whereby, via the information line CS, the transmittal code (1001011) is again transmitted to the engine control device MS. The engine control device MS compares this transmitted transmittal code with the comparison code stored in the memory S. If, as in the illustrated case, the two code words correspond to one another, the functions which are required for the start of the operation of the internal-combustion engine M are released again by way of the control output signals.

The comparison code which is available in the memory S because of a first transmission of the transmittal code from the central locking and anti-theft warning system ZV-DWA may, in certain embodiments of the invention, for example, in the case of each further activating and deactivating operation, be changed in a specified manner by a preprogrammed algorithm. In this case, the central locking and anti-theft warning system ZV-DWA changes, after a first transmission of the transmittal code CS' (1001100), also the transmittal code to be transmitted during each further activating and deactivating operation according to the same algorithm. Thus, in these embodiments also, the respective newly transmitted transmittal code will always correspond to the comparison code which is available in the memory S.

If the proper deactivating operation by way of the remote control key FS is circumvented in that, for example, the central locking and theft warning system ZV-DWA is destroyed or unplugged, the transmittal code (1001011), as the switch-off command of the central locking and anti-theft warning system ZV-DWA or as the switch-on command of the engine control device MS, will not occur. Thereby the start of the operation of the engine control device MS or of the internal-combustion engine M is continued to be prevented. Motor vehicle theft is effectively prevented by means of this embodiment according to the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for preventing motor vehicle theft, comprising:

performing an activating operation for an anti-theft device;

switching off a drive control device when the anti-theft device is activated in the activating operation;

performing a deactivating operation of the anti-theft device;

automatically generating and transmitting from the anti-theft device during the deactivating operation, a transmittal code to the drive control device, said anti-theft device and said drive control device being internally located in the motor vehicle; and switching the drive control device back on again only when the transmitted transmittal code corresponds to a comparison code in the drive control device;

further comprising the step of automatically generating and transmitting from the anti-theft device the comparison code to the drive control device before performing the deactivating operation for the anti-theft device; and further comprising the step of changing the comparison code during each activating operation with respect to a previous transmittal code.

2. A process for preventing motor vehicle theft, comprising:

performing an activating operation for an anti-theft device;

switching off a drive control device when the anti-theft device is activated in the activating operation;

performing a deactivating operation of the anti-theft device wherein the anti-theft device is deactivated during the deactivating operation by a wireless code signal;

automatically generating and transmitting a transmittal code from the anti-theft device to the drive control device during the deactivating operation, said anti-theft device and said drive control device being integral with and formed within the motor vehicle such that the anti-theft device and drive control device are at least substantially inaccessible from the passenger compartment of the motor vehicle; and switching the drive control device back on again only when the transmitted transmittal code corresponds to a comparison code in the drive control device.

3. A process according to claim 2, further comprising the step of automatically generating and transmitting from the anti-theft device the comparison code to the drive control device before performing the deactivating operation for the anti-theft device.

4. A process according to claim 3, further comprising the step of transmitting, via the anti-theft device, the same transmittal code for a subsequent deactivating operation as was used as the comparison code for the preceding activating operation.

5. A process according to claim 3, further comprising the step of changing the comparison code during each activating operation with respect to a previous transmittal code.

6. The process of claim 2, further comprising an energizing operation of an ignition system of the motor vehicle after the deactivating operation occurs.

7. The process of claim 2, wherein the anti-theft device is electrically activated during the activating operation.

8. The process of claim 2, wherein the anti-theft device activating operation positively controls activation of the anti-theft device with a flow of electrical current during the activating operation.

9. The process of claim 2, wherein the transmitted transmittal code is generated and transmitted by the anti-theft device and not from a remote control key.

10. The process of claim 2, wherein the activating operation of the anti-theft device is initiated by a wireless signal from a remote control key.

11. The process of claim 3, wherein the drive control device receives but does not request the transmitted transmittal code.

12. The process of claim 3, wherein the anti-theft device automatically generates and transmits a transmittal code during the deactivating operation without receiving a code request signal.

13. The process of claim 3, wherein the drive control device stores the transmitted transmittal code to be used as a comparison code.

14. The process of claim 4, wherein the anti-theft device automatically generates and transmits a transmittal code during the deactivating operation without receiving a code request signal.

15. A process for preventing motor vehicle theft, comprising the acts of:

(i) activating an anti-theft device which then disables a drive control device, thereby rendering a motor vehicle inoperable, wherein the anti-theft device is activated by a wireless code signal;

(ii) later deactivating the anti-theft device, in order to enable the drive control device, thereby rendering the motor vehicle operable;

wherein the anti-theft device upon deactivation automatically generates and transmits a transmittal code to the drive control device;

wherein the drive control device is enabled only if the transmitted transmittal code corresponds to a comparison code in the drive control device; and both the anti-theft device and the drive control device are integrated within a motor vehicle and are at least substantially inaccessible from the passenger compartment of the motor vehicle.

16. A process according to claim 2, wherein the deactivating operation is performed by closing a switch by a door lock.

17. A process according to claim 2, wherein the deactivating operation is performed by the input of a safety code via a keyboard.

18. A process according to claim 15, wherein the deactivating operation is performed by the input of a safety code via a keyboard.

19. A process according to claim 15, wherein the deactivating operation is performed by a wireless emission of a code signal by a portable transponder.

20. A process according to claim 15, wherein the deactivating operation is performed by closing a switch by a door lock.

21. A process for preventing motor vehicle theft, comprising:

performing an keyless activating operation for an anti-theft device;

switching off a drive control device when the anti-theft device is activated in the activating operation;

performing a keyless deactivating operation of the anti-theft device;

automatically generating and transmitting from the anti-theft device during the deactivating operation, a transmittal code to the drive control device, said anti-theft device and said drive control device being internally located in the motor vehicle; and switching the drive control device back on again only when the transmitted transmittal code corresponds to a comparison code in the drive control device.

\* \* \* \* \*